United States Patent [19]

Genequand

[11] Patent Number: 4,615,097
[45] Date of Patent: Oct. 7, 1986

[54] APPARATUS FOR PRECISE POSITIONING OF OPTICAL COMPONENTS

[75] Inventor: Pierre Genequand, Geneva, Switzerland

[73] Assignee: Cabloptic S.A. & Fondation Suisse pour la Recherche en Microtechnique, Switzerland

[21] Appl. No.: 658,298

[22] Filed: Oct. 5, 1984

[30] Foreign Application Priority Data

Oct. 5, 1983 [FR] France .................... 83 15955

[51] Int. Cl.$^4$ .............. B23Q 3/00; B23Q 1/04; B23Q 1/22; G02B 6/36
[52] U.S. Cl. ........................ 29/466; 29/464; 29/467; 29/468; 269/73; 350/96.2
[58] Field of Search ............... 29/416, 464, 466, 467, 29/468, 280, 590; 269/73; 350/96.2; 156/502, 158, 508; 252/2

[56] References Cited

FOREIGN PATENT DOCUMENTS

| 90724 | 10/1983 | European Pat. Off. ........... 350/96.2 |
| 105214 | 8/1980 | Japan ................................. 350/96.2 |
| 156812 | 12/1981 | Japan ................................. 350/96.2 |
| 129403 | 8/1982 | Japan ................................. 350/96.2 |

*Primary Examiner*—Howard N. Goldberg
*Assistant Examiner*—R. S. Wallace
*Attorney, Agent, or Firm*—Lerner, David, Littenberg, Krumholz & Mentlik

[57] ABSTRACT

Method and apparatus are disclosed for precisely positioning a pair of components such as optical components, including optical fibers, utilizing an apparatus which includes a first support for mounting the first component, a second support for mounting the second component and an elastic joint formed on the first support for moving the first support in relation to the second support by bending the elastic joint. In a preferred embodiment, the elastic joint includes a pair of parallel elastically bendable arms formed on the first support and bendable in a first direction so that the elastic joint provides a translation module.

19 Claims, 18 Drawing Figures

APPARATUS FOR PRECISE POSITIONING OF OPTICAL COMPONENTS

FIELD OF THE INVENTION

The present invention relates to apparatus for precisely positioning first and second components. More particularly, the present invention relates to apparatus for precisely positioning first and second optical components, such as optical fibers, in relation to each other. Still more particularly, the present invention relates to apparatus for precisely positioning first and second optical components mounted on supports in which the two supports are moved with respect to each other.

In accordance with another embodiment, the present invention relates to a method for positioning first and second components. Still more particularly, the present invention relates to a method for precisely positioning first and second optical components, such as optical fibers.

BACKGROUND OF THE INVENTION

The assembling of microoptic elements, such as optical-fiber couplers, requires the extremely precise positioning of the parts or components which are to be coupled. The precision required in such procedures is on the order of one micron for multimode fibers, and on the order of one-tenth of a micron for monomode fibers. In order for such assemblies to be made in a repeatable manner, it is indispensable to be able to utilize apparatus which is capable of holding the components which are to be assembled, and of moving one in relation to the other while at the same time complying with these precise tolerances.

The conventional sliding table, with its slides and swivel pins, is designed for relatively large movements, e.g. on the order of several tens to several hundreds of millimeters, and in any event is complicated, expensive and poorly suited to the demands of small movements of very high precision (those in which the size is no greater than one millimeter). This is especially so because of the problems of mechanical slackness and lags, which are aggravated by the effect of friction.

Furthermore, it is normally required that the components of optical couplers then be attachable in a permanent manner in the position which is reached after their mutual positioning, by means of glue or screws for example. In order to be able to meet these requirements, and to also be able to avoid any untimely movement of the components during their placement and attachment, the components which are to be coupled may include a flat side by which they are placed in contact with each other. The adjustment of their relative positions is then achieved by sliding one against the other in their plane of contact, either through translation along two perpendicular axes, or through rotation around an axis. An adjustable force is also applied in order to press the parts (components) against each other in intimate contact during the entire positioning and securing operation, in order to avoid distortions resulting from the assembly process, which most commonly arise due to retractions of glue from the joints where the components are not in ciirect contact with one another.

Finally, placement of the components which are to be assembled in intimate contact with each other during their relative positioning in the plane of contact results in the inability to carry out these corresponding movements of components in a continual manner, at least at the microscopic level, where a "jerkiness" results, due to the braking forces produced by friction therebetween.

It is an object of the present invention to overcome these disadvantages of existing systems by creating a device that is well suited to micromovements and, furthermore, which permits the components to be assembled after their precise positioning in contact with each other, and which eliminates the lack of precision which results from the jerky movements created by such friction.

SUMMARY OF THE INVENTION

In accordance with the present invention it has now been discovered that these and other objects can be attained by providing an apparatus and method for the precise positioning of first and second components with respect to each other in which these components are mounted on respective first and second supports, and in which at least one of the supports is made movable by at least one joint that is actuated by purely elastic bending. In a preferred embodiment, at least one of the two supports is unified with a frame by at least one joint that is actuated by purely elastic bending.

In accordance with a preferred embodiment of the apparatus of the present invention for precisely positioning first and second components with respect to each other, the apparatus includes first support means for mounting a first component, second support means for mounting a second component, and movement means for moving at least the first support means in relation to the second support means, comprising an elastic joint member formed on the first support means whereby movement of the first support means is accomplished by bending the elastic joint member. In a preferred embodiment, the movement means is integrally formed with the first support means, and the first and second components are preferably optical components, such as optical fibers and the like.

In accordance with another embodiment of the apparatus of the present invention, the elastic joint member comprises first and second parallel elastically bendable members formed on the first support means and being bendable in a first direction, and parallel to each other in a direction perpendicular to that first direction, so that the elastic joint member comprises at least one translation module.

In accordance of another embodiment of the apparatus of the present invention, the elastic joint member comprises first and second elastically bendable members formed on the first support means, the first and second elastically bendable members being bendable in a first direction, and being arranged in a manner so as to converge with each other so that the elastic joint member comprises at least one rotation module.

In accordance with a preferred embodiment of the apparatus of the present invention, the elastic joint member comprises first and second parallel elastically bendable members bendable in a first direction, and being parallel to each other in a direction perpendicular to that first direction, and the elastic joint member further comprises third and fourth elastically bendable members bendable in a second direction, and being arranged in a manner so as to converge with each other, so that the elastic joint member comprises a combination of at least one translation module and at least one rotation module.

In accordance with another embodiment of the apparatus of the present invention, the third and fourth elastically bendable members are formed on the first support means and the first and second elastically bendable members are formed on the third and fourth elastically bendable members.

In accordance with another embodiment of the apparatus of the present invention, the elastic joint member comprises a first elastic joint member, and the apparatus includes a second elastic joint member formed on the second support means, whereby movement of the second support means is accomplished by bending the second elastic joint member. Preferably, the first and second elastic joint members are integrally formed with the first and second support means, respectively, and the first elastic joint member comprises first and second parallel first elastically bendable members formed on the first support means, and bendable in a first direction, as well as being parallel to each other in a direction perpendicular to that first direction, so that the first elastic joint member comprises at least one translation module, and the second elastic joint member comprises third and fourth parallel second elastically bendable members formed on the second support means, and bendable in a second direction, these third and fourth members being parallel to each other in a direction perpendicular to the second direction so that the second elastic joint member comprises at least one translation module. Preferably, these first and second directions are substantially perpendicular to each other, or in another preferred embodiment they are angularly displaced with respect to each other so as to permit the relative movement of the first and second support means in oblique translation.

In accordance with another embodiment of the apparatus of the present invention, and in which the bending of the elastic joint member occurs substantially in a first plane, at least one of the first and second support means includes mounting means permitting relative adjustment of at least one of the first and seccond support means in a direction substantially perpendicular to the first plane. In a preferred embodiment the mounting means comprises an elastic membrane.

In accordance with a preferred embodiment of the apparatus of the present invention the first support means includes the mounting means, which comprise holding strip means which are elastically bendable in the direction substantially perpendicular to the first plane. Preferably, the elastic joint member comprises first and second parallel elastically bendable members formed on the first support means, being bendable in a first direction, and being parallel to each other in a direction substantially perpendicular to that first direction, whereby the elastic joint member comprises at least one translation module, and the holding strip means are oriented in a direction substantially coincident with that first direction. Preferably, the mounting means comprises first mounting means, and the apparatus includes second holding strip means which are elastically bendable in a direction substantially perpendicular to the first plane.

In accordance with another aspect of the present invention, a method is provided which includes mounting the first component on a first support means formed on an elastic joint member, mounting the second component on a second support means, and moving the first support means in relation to the second support means by bending the elastic joint member. In a preferred embodiment, the elastic joint member comprises first and second parallel elastically bendable members, and the moving of the first support member comprises bending these first and second parallel elastically bendable members in a first direction perpendicular to the direction of the first and second parallel elastically bendable members so as to produce translational movement of the first support means.

In accordance with another embodiment of the method of the present invention, the elastic joint member comprises first and second converging elastically bendable members, and moving of the first support member comprises bending the first and second converging elastically bendable members in a first direction so as to produce rotational movement of the first support means.

In accordance with a preferred embodiment of the method of the present invention, the elastic joint member comprises first and second parallel elastically bendable members, and third and fourth converging elastically bendable members, moving the first support means comprises bending the first and second parallel elastically bendable members in a first direction perpendicular to the direction of the first and second parallel elastically bendable members, and moving the third and fourth converging elastically bendable members in a second direction so as to produce a combination of translational and rotational movement of the first support means.

In accordance with a preferred embodiment of the method of the present invention, the elastic joint member comprises a first elastic joint member, a second elastic joint member is provided formed on the second support means, and the method includes moving the second support means in relation to the first support means by bending the second elastic joint member. In accordance with a preferred embodiment, the first elastic joint member comprises first and second parallel elastically bendable members, and moving of the first support means comprises bending the first and second parallel elastically bendable members in a first direction perpendicular to the direction of the first and second elastically bendable members so as to produce translational movement of the first support means, and the second elastic joint member comprises third and fourth parallel elastically bendable members, so that moving of the second support means comprises bending the third and fourth parallel elastically bendable members in a second direction perpendicular to the direction of the third and fourth elastically bendable members so as to produce translational movement of the second support means. Preferably, moving of the first and second support means is carried out perpendicular to each other. In another embodiment, moving of the first and second support means is carried out in the first and second direction angularly with respect to each other.

In accordance with another embodiment of the method of the present invention the moving of the first support means is effected in a first plane, and the method includes adjusting the location of the first support means in a direction substantially perpendicular to the first plane.

The present invention can be more fully understood by referring to the detailed description set forth below, which itself makes reference to the attached firgures, in which.

DETAILED DESCRIPTION

Accomplishment of the translational and rotational movements in the plane of contact of the components to be positioned in accordance with this invention is based upon the modular utilization of joints with flexible plates which present the following characteristics:

(1) These plates are embedded at one end in a part which forms a single piece with the baseplate;

(2) These plates are embedded at their other end in a part which forms a single piece with a movable plate; and (3) The three dimensions of the plate—that is, the length, $1_o$; the width, $1_a$; and the thickness, e—are defined by the relationships; $1_o >> e$ and $1_a >> e$.

As a practical matter, in fact generally: $1_o \simeq 100e$ and $1_a \simeq 20e$.

Figure 1:
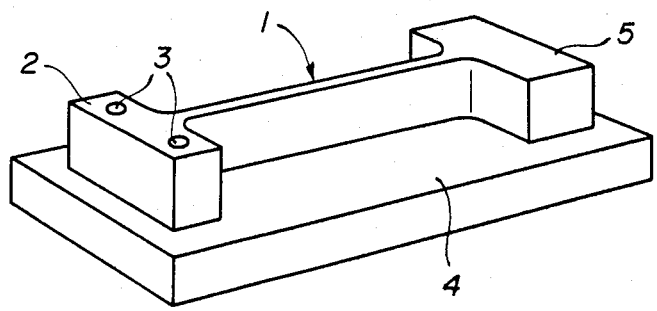
FIG. 1 is a front, elevational, perspective view of a preferred apparatus of the present invention including a joint having purely elastic bending.

Reference will now be made to the figures, in which corresponding numerals refer to corresponding portions thereof. Referring first to FIG. 1, the joint with purely elastic bending shown therein is made up of a plate, 1, one end of which is attached to an immovable part, 2, which forms a unit, by means of two screws, 3, with a baseplate, 4, which constitutes the frame of the device. The other end of the plate, 1, forms a unit with a movable part, 5, which itself constitutes a movable support for a component, or which forms a unit with a movable support for this component.

By virtue of the laws of elasticity, the movement, $m_e$, of the movable part, 5, in the direction of the thickness of the strip, is relatively free in view of the large deflection of this strip in this direction, whereas the movement, $m_a$, in a direction corresponding to the width of the strip remains weak, and the movement, $m_o$, in a direction corresponding to the length of the strip, is negligible. The exact value on the elasticities corresponding to these three movements is defined by the following equations:

$$m_e = \frac{4F_e l_o^3}{E l_a e^3} \quad m_a = \frac{4F_a l_o^3}{E e l_a^3} \quad m_o = \frac{F_o l_o}{E l_a e}$$

where E stands for Young's module for the material of the strip; $F_e$ is the force applied, for example, by a micrometric moving screw; $F_a$ depends on the weight of the movable plate; and $F_o$ is a function of the friction between the parts or components which are to be positioned.

It is also noted that the movement $m_o$ is much weaker than the movement $m_e$, which is particularly important for the independence of the control in the $m_o$ and $m_e$ directions. The effect of $m_a$, which is intrinsically weak, becomes negligible when one considers its projection in the plane $m_o m_e$.

Figure 2:
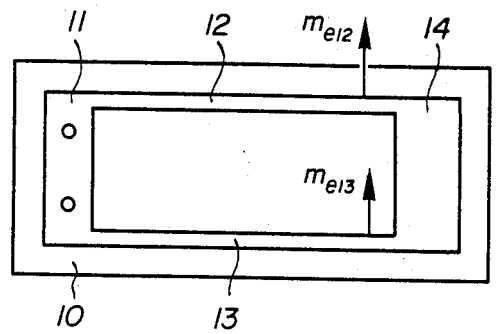
FIG. 2 is a top, elevational, perspective view of another embodiment of the apparatus of the present invention comprising a translation module.
Figure 3:
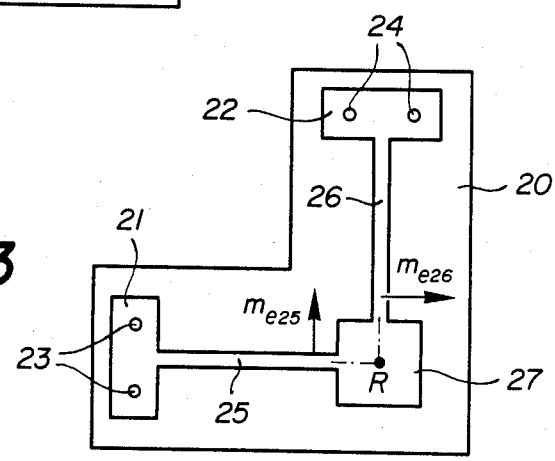
FIG. 3 is a top, elevational, perspective view of another embodiment of the apparatus of the present invention comprising a rotation module.
Figure 4:
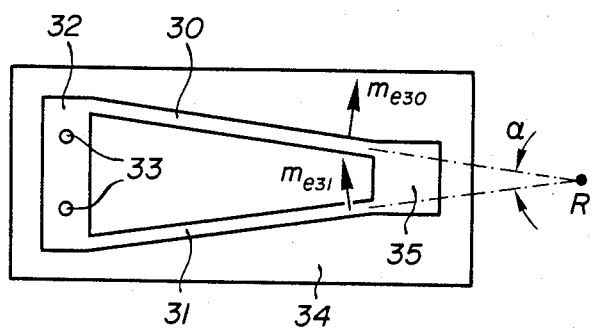
FIG. 4 is a top, elevational, perspective view of another apparatus of the present invention comprising a rotation module.

The movement modules illustrated in FIGS. 2, 3 and 4 permit movements in one direction in a plane. In order to produce assemblies which require adjustment in a single direction, one of the parts to be assembled is attached to the movable support, and the other is attached to the baseplate or frame, and control of the relative movement of the movable support is accomplished with an appropriate control device.

Turning to FIG. 2, a device is shown therein comprising a frame, 10, on which is mounted a nonmovable part, 11, featuring two parallel strips, 12 and 13, rigidly attached to a part, 14, that forms an integral unit with the movable support, or which can itself constitute the movable support. The strips, 12 and 13, being parallel to each other and having the same length, thereby permit one to realize a micromovement of translation $m_{e12} = m_{e13}$ of the moving part, 14. This type of movement module may be referred to as a translation module.

Referring next to the device shown in FIG. 3, this device includes a baseplate or frame, 20, which supports two nonmovable parts, 21 and 22, which are mounted on the frame by means of screws, 23 and 24, respectively, and each of which supports a flexible strip, 25 and 26, respectively. The ends of these strips, 25 and 26, that are not attached to the nonmovable parts, 21 and 22, are attached to a movable plate, 27, which itself constitutes the movable support for carrying one of the components which is to be assembled, such as, for example, an optical fiber, or which forms a unit this this support. The two strips, 25 and 26, in this case are arranged at right angles with respect to each other, and their imaginary extensions cross at a point, R, which defines the intersection of plane $me_{25}me_{26}$ (defining, respectively, the elastic movements of strip 25 and strip 26) with the axis of rotation of the movable plate, 27. In the example thus shown, the center of rotation, R, is located within the circmference of the movable plate, 27. However, this center of rotation could be located at any other location in that plane.

Referring next to the example shown in FIG. 4, the two strips, 30 and 31, have one end that forms a unit with a part, 32, that is attached—for example, by two screws, 33—to a baseplate, 34, which constitutes the frame, and their other ends are attached to a movable plate, 35. The point of intersection R of the imaginary extensions of these two strips, 30 and 31, occurs outside the movable plate, 35, and the rotation module created in this manner is thus centered outside of the movable plate.

When viewed in this light, it can be seen that the translation module shown in FIG. 2 actually constitutes a special case of a rotation module in which the center of rotation is extended to infinity.

Figure 5:
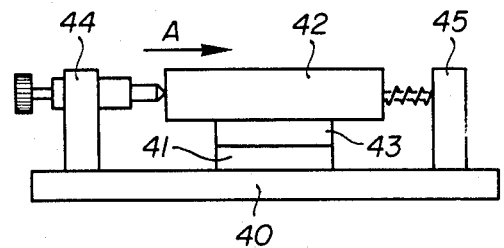
FIG. 5 is a side, elevational, perspective view of an apparatus of the present invention in association with a control mechanism for effecting movements thereof.

Referring to the device shown in FIG. 5, this device more specifically illustrates a mechanism which can accomplish the actual movement of at least one of the components in relation to the other. This device is composed of a frame, 40, on which a nonmovable support, 41, is directly mounted. This support, 41, carries one of the two components which are to be assembled. A movable plate, 42, carries the support, 43, of a second part which is to be positioned in relation to the first. The joints that allow the movement of the movable plate, 42, are not shown in this figure. The baseplate supports a micrometric screw mechanism, 44, at one end, and this permits the application of thrust in the direction of the arrow, A, to the movable plate, 42. At the opposite end of the micrometric screw mechanism, 44, is mounted a backup spring stop, 45. This type of device permits control of the movement in one direction in a plane for all the two-joint modules in FIGS. 2, 3 and 4.

Figure 6:
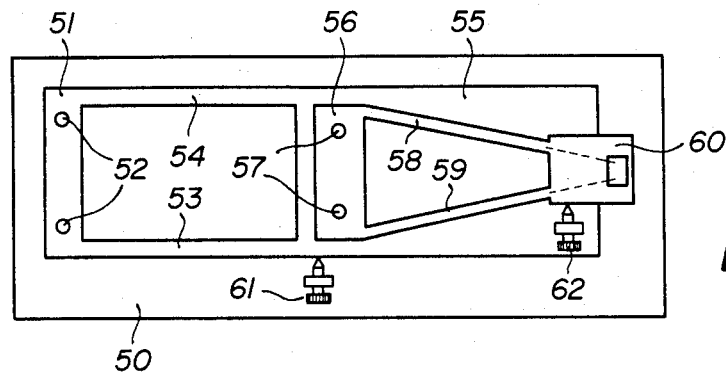
FIG. 6 is a top, elevational, perspective view of another apparatus in accordance with the present invention comprising a combination of a translation module and a rotation module.

In order to achieve control of movement in several directions, it is possible to combine the modules for movement in one direction either in series of in parallel. A combination in series is shown in FIG. 6, in which is illustrated a device comprising a baseplate, 50, on which is directly mounted a first nonmovable part, 51, which is attached to the baseplate by screws, 52. This nonmovable part, 51, serves as a support for the ends of two parallel strips, 53 and 54, the opposite ends of which form a unit with a first movable plate, 55. These components in and of themselves thus form a translation module, as defined above. Movable plate, 55, in turn serves as a support for a part, 56, which is attached to plate, 55, by means of screws, 57. This part, 56, includes two strips, 58 and 59, the opposite ends of which form a unit with a second movable plate, 60, which then can directly serve as a support for the parts to be assembled, or which can be attached to such a support. The nonmovable part, 56, strips, 58 and 59, and second movable plate, 60, constitute a basic rotation module, as described above with reference to FIG. 4. A first micrometric screw, 61, acts on the translation module, and a second micrometric screw, 62, acts on the rotation module. The other part of the pair of parts which are to be assembled is preferably attached directly to the baseplate, 50.

Figure 7:
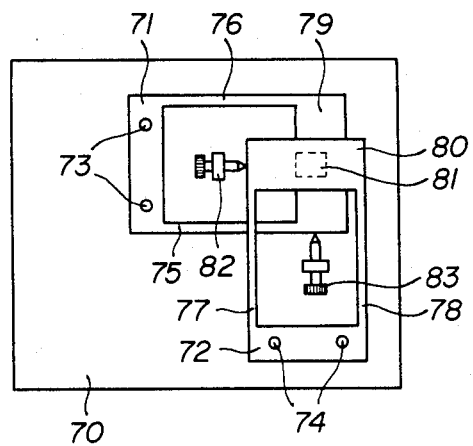
FIG. 7 is a top, elevational, perspective view of another apparatus in accordance with the present invention comprising a combination of two translation modules.

Referring next to FIG. 7, a combination of basic modules is shown arranged in parallel. In this design, the device comprises a baseplate, 70, which supports a first nonmovable unit, 71, and a second nonmovable unit, 72, which are mounted on the baseplate, for example, by means of screws, 73 and 74. Each of these two units, 71 and 72, is a single piece with two parallel strips, 75 and 76, and 77 and 78, respectively, of two translation modules, perpendicularly mounted with respect to each other. Strips 75 and 76 carry a first movable plate, 79, and strips 77 and 78 carry a second movable plate, 80. Movable plate 79 in turn carries, either directly or by means of an appropriate support, one of the components to be assembled (not shown), while movable plate 80 carries, again either directly or indirectly by means of an appropriate support, the second component, 81, which is to be positioned with respect to the first component. Two devices, 82 and 83, for the micrometric control of the movements of the two translation modules, are mounted on the baseplate 70.

Another problem which can arise during the positioning and assembly of components is that of attachment of parts to either the movable plates or the baseplate during the micromovement operations. In order to accommodate for movements perpendicular to the plane of these micromovements of one of the parts to be assembled in relation to the other it is required that one of these parts be held in a flexible manner for these perpendicular movements, while at the same time being held rigidly in the plane of the micromovements. However, these same movements must no longer be permitted after the two parts have been placed in contact, which requires that the second mentioned part may not be moved in a direction perpendicular to the plane of the micromovements. These conditions can be met by attaching the first part—that is, the one that can accommodate for movement perpendicular to the plane of the micromovements—to its support plate by means of a flexible membrane, which is sensitively set in the plane of the micromovements during same in order to minimize the torque exerted on that membrane. The second part—that is, the one that is mounted in a fixed position in a direction perpendicular to the plane of the micromovements—is attached directly to the baseplate. In this manner, pressure applied to the first part perpendicular to the membrane permits the two parts to be brought into contact with each other.

Figure 8:
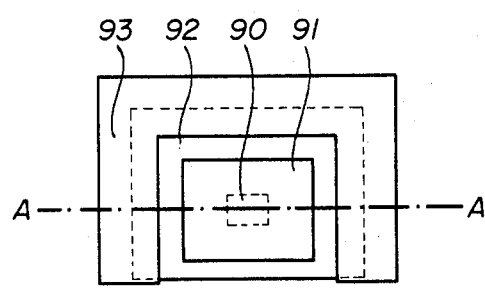
FIG. 8 is a top, elevational, perspective view of another apparatus of the present invention including a movable support.
Figure 9:
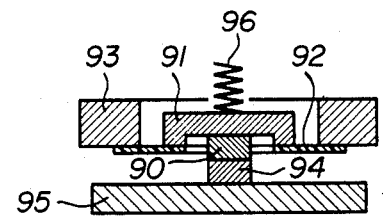
FIG. 9 is a side, elevational, sectional view of the apparatus of FIG. 8 taken along line A—A of FIG. 8.

A means for attachment employing such a membrane is shown in FIGS. 8 and 9. As shown therein, one of the parts to be assembled, 90,—comprising, for example, an optical fiber embedded in a block of resin, or mounted in a rigid support—is rigidly mounted on a part tray, 91. This part tray, 91, is mounted—for example, by gluing, riveting, screwing, or any other recognized means—to a membrane, 92, made, for example, of a rectangular piece cut from a sheet of elastic material, or of thin strips having elastic properties that are relatively great for their thickness. The membrane, 92, is attached by recognized means to a movable plate, 93, which, in the model shown, is comprised of a rigid frame in the form of a U. The second part, 94, which is to be assembled to part 90, forms a unit with the baseplate 95. An adjustment spring, 96, exerts thrust on the center portion of the part tray, 91.

These two components, 90 and 94, are attached, respectively, to the part tray and to the baseplate, by gluing, by a partial vacuum (if the bearing surface is large enough), or by conventional vices. This approach, however, may lead to difficulties due to the fact that the glued parts are difficult to detach, or that the vices can get in the way.

Figure 10:
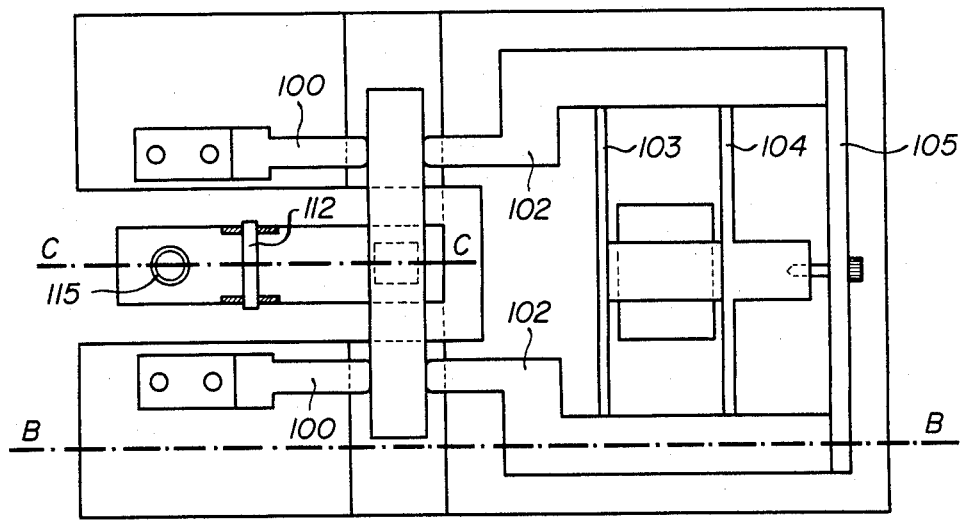
FIG. 10 is a top, elevational, perspective, partially sectional view of the lower portion of another apparatus of the present invention.
Figure 11:
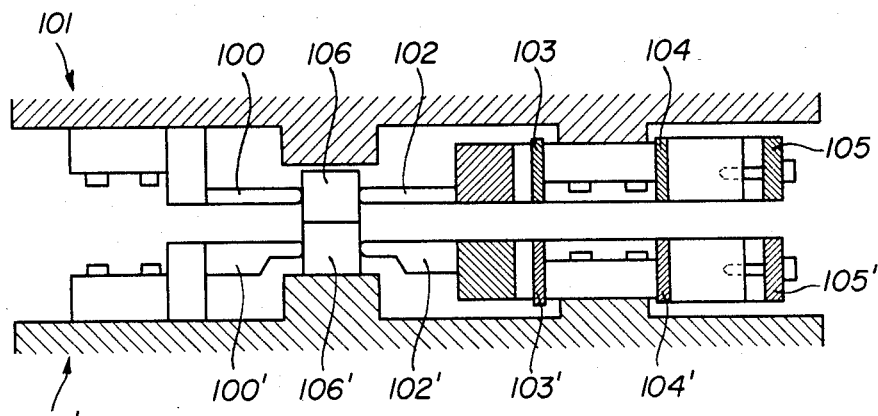
FIG. 11 is a side, elevational, partially sectional view of the apparatus shown in FIG. 10 taken along line B—B thereof.
Figure 12:
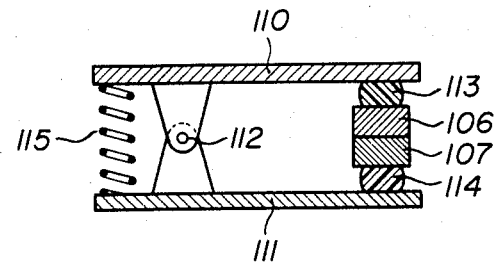
FIG. 12 is a side, elevational, partially sectional view of a portion of the apparatus shown in FIG. 10 taken along line C—C thereof.

To overcome these difficulties, a second means for holding the parts is proposed, as is illustrated in FIGS. 10, 11 and 12. As shown therein, the membrane and the part tray are replaced therein by elastic holding strips that are flexible in a direction perpendicular to the plane of the micromovements.

The device shown in FIGS. 10-12 comprises a first series of holding strips, 100, which are attached directly to the adjustment support plate, 101, and a second series of holding strips, 102, which are attached to the support plate by means of elastic-strip translation modules, 103 and 104, in connection with which the direction of translation is oriented parallel to the holding strips. A spring clamp, 105, permits the pushing of the strips of the second series of strips, 102, in the direction of the first series of strips, 100, in order to hold the part to be assembled, 106, in place, in the plane of the micromovements, while at the same time freedom of perpendicular adjustment is retained by means of the flexibility of the holding strips.

The other component to be assembled, 107, can be held by a similar device, comprising a first series of holding strips, 100', attached directly to the support plate, 101', and a second series of holding strips, 102', which are attached to the support plate by means of elastic-strip translation modules, 103' and 104'. A spring clamp, 105', permits the strips of the second series of strips, 102', to be pushed in the direction of the first series of strips, 100'. The series of strips, 100' and 102', are rigid, so that this second component to be assembled, 107, is completely immobilized on its support plate, 101'.

The pressure clip shown in FIG. 12 comprises two jaws, 110 and 111, which move in relation to each other around a hinge, 112. The components to be assembled, 106 and 107, are held by two pressure pads, 113 and 114, made of elastomeric material.

In the closed position, the two jaws are pressed against each other by a compression spring, 115. This clip permits the components to be assembled to be placed into contact with each other. Moreover, because it is independent, it permits the holding of the parts in their respective positions once the assembly has been made, as well as the moving of the entire assembly from the micromovement machine to another work station without changing the relative positions of these parts.

These holding devices for the components to be assembled permit adjustment of the position of these components in order to bring them into contact with each other without compromising the precision of later adjustments in their positions in the plane of contact. This goal can also be attained by the use of purely elastic bending.

Figure 13:
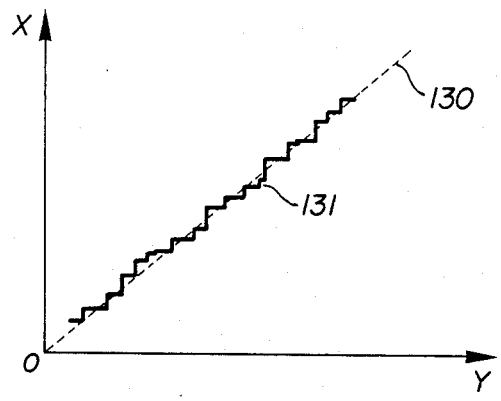
FIG. 13 is a graphical representation illustrating theoretical movement and actual movement of components to be assembled in accordance with the method of the present invention.

Referring to FIG. 13, the "jerky" movement of the component to be positioned in relation to the other is illustrated. The effects of such jerky progression is encountered in a system of mechanical translation every time a static friction force opposes the movement. Starting from an at-rest situation, the micrometric advance screw is initially activated. Because of static friction, the parts to be assembled initially refuse to slide against each other. The parts transmitting the advance movement strain against each other under the stress. When the threshold of resistance of friction is then passed, sliding begins. In general, for slow rates of movement, the frictional forces associated with the rate of sliding are below the static threshold. Thus, the stress of the parts straining against each other is no longer compensated for, and feeds the sliding; after a certain amount of movement, the tension of the parts transmitting advance movement slacks off, and the friction now brakes the sliding. Soon, a new equilibrium position is reached. Thus, even if one activates the micrometric screw very slowly and continuously, the advancing movement of the part to be assembled occurs jerkily, as it jumps from one position of equilibrium to the next.

Referring to FIG. 13, plotted on the X axis thereof is the movement date—that is, the progress of the screw at an infinitely slow speed, and plotted on the Y axis thereof is the actual movement of the part to be positioned. In the absence of friction, the theoretical movement is shown by straight line 130, shown as a dotted line, and the actual movement is illustrated by jagged curve, 131.

What actually occurs in practice, however, is that one can tolerate a certain amount of jerkiness, such as jumps on the order of about one micron on the X axis. However, the precision required on the Y axis is much stricter, i.e. the order of about 0.1 micron.

This is especially true in connection with assemblies for monomode-fiber couplers by evanexcent waves. The fibers are approached tangentially, and the coupling takes place in the direction of the length of the fibers. Movements in the direction of the axis of the fibers are not critical. On the other hand, movements on the order of about one micron in the transverse direction may cause variations in the coupling of between 10% and 50%.

The movement process used in connection with the devices hereof is based on the observation that the successive positions of equilibrium of the jumps are essentially aligned in the theoretical direction of progress. This phenomenon is due to the fact that the friction results from the contact of a large number of microscopic irregularities of random (but probabilistically predictable) form. The sum of the components of the forces which are transmitted by each irregularity in the direction perpendicular to the direction of progress is zero, and the jumps thus occur in the direction of progress. To obtain a translation of predetermined precision in the direction of one axis, the oblique translations in relation to this axis are combined.

Figure 14:
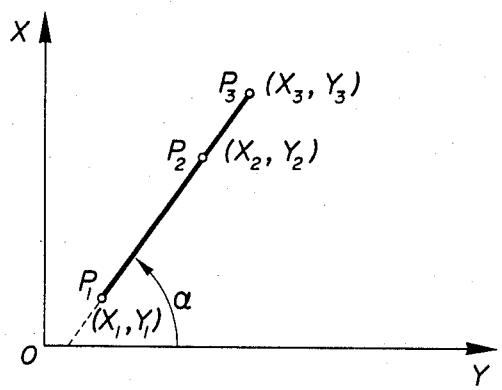
FIG. 14 is a graphical representation illustrating the principle of oblique translation of components to be assembled in accordance with the method of the present invention.

The principle of oblique translation is illustrated in FIG. 14. That is, by a translation starting from point P1 (coordinates X1, Y1). The theoretical advance movement is programmed by means of the micrometric screw to arrive at point P2 (coordinates X2, Y2). Because of the jerkiness of the movement, however, the actual point of arrival is P3 (coordinates X3, Y3). The precision of this travel is given by the distance $r_{2,3}$ separating P2 from P3. The precision along each axis of coordinates in the plane of movement, XY, is shown by the following equations:

Precision along Y: $\theta_y = Y3\ Y2 = r_{2,3} \sin \alpha$

Precision along X: $\theta_x = X3\ X2 = r_{2,3} \cos \alpha$ where $\alpha$ stands for the angle $\overrightarrow{OX}, \overrightarrow{P1P3}$.

If angle $\alpha$ is small, these equations are comparable to:

$\theta_y = r_{2,3}$ with $\alpha \ll 1$ $\theta_x = r_{2,3}$

It can thus be seen that the precision along one of the axes of translation can indeed become greater than the uncertainty $r_{2,3}$ of the jerky movement.

Figure 15:
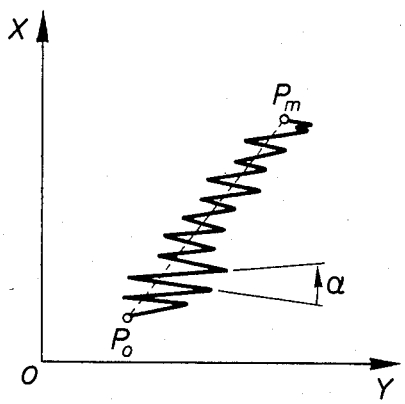
FIG. 15 is a graphical representation illustrating movement of the components to be assembled in accordance with the method of the present invention produced from a combination of elementary oblique translations.

Referring next to FIG. 15, a method is shown for achieving a translation in the plane X,Y with a precision on the order of one micron on the X axis, and a precision on the order of 0.1 micron on the Y axis, for the values $r_{2,3} = 1$ micron and $\alpha = 0.1$ radian.

The total translation, $\overrightarrow{P_{oPm}}$, is equal to the sum of the basic oblique translations. The precision is that of a basic translation, and does not depend on the number of basic translations, since the average value of the jerkiness errors is zero (see FIG. 13).

Figure 16:
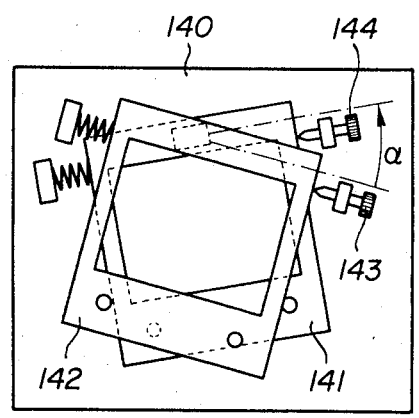
FIG. 16 is a top, elevational, perspective view of another apparatus in accordance with the present invention for obtaining oblique translation of the components to be assembled in accordance therewith.

In practice, such oblique translations can be achieved with a device such as that shown in FIG. 16, comprising a baseplate on which are mounted two translation modules, 141 and 142, which are arranged in a manner such that their axes form an angle $\alpha$ between them. Each of these modules is connected to a movement control mechanism, such as micrometric screws, 143 and 144, respectively.

The combination of these various elements permits the goals explained above to be met. That is, micromovement of one of the parts to be assembled can be performed, and the precision of the movements of the movable part can be programmed.

Figure 17:
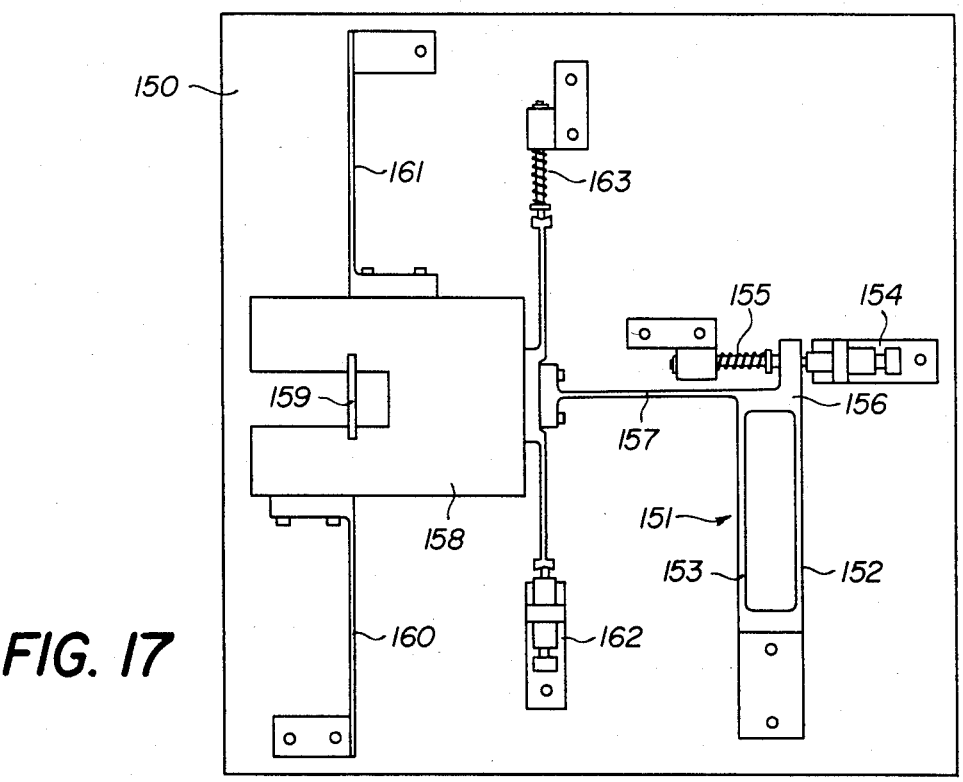
FIG. 17 is a top, elevational, prespective view of the lower subassembly of another apparatus in accordance with the present invention for obtaining combined oblique translation and movement of one of the components to be assembled in accordance with therewith.
Figure 18:
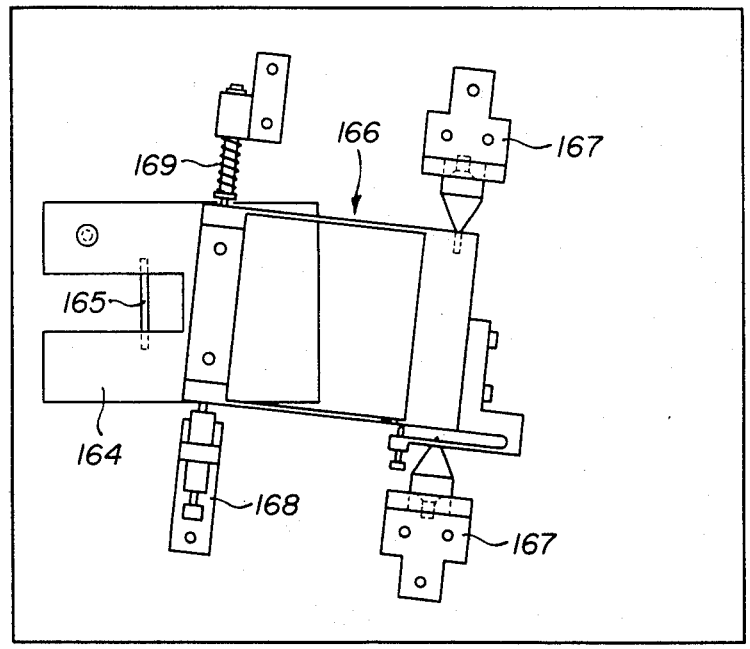
FIG. 18 is a top, elevational, prespective view of the uppe subassembly of the apparatus shown in FIG. 17.

A model of such a combination is illustrated in FIGS. 17 and 18, which show a device comprising various movement modules and means to permit oblique translation of one component in relation to the other.

This device comprises a baseplate, 150, on which is mounted a translation module, 151, made up of two parallel elastic strips, 152 and 153, which are connected to a movement control mechanism made up of a micrometric screw, 154, and a movable stop, 155. The movable plate, 156, of this module carries an elastic strip, 157, which is arrayed perpendicular to strips 151 and 153, and one end of which is attached to support plate, 158. This plate, carrying one of the parts to be positioned, 159. is further supported by two elastic strips, 160 and 161, which, with strip 157, form a rotation module controlled by a micrometric screw, 162, connected to a movable stop, 163. The whole structure thus constitutes the combination of a rotation module and a translation module.

Referring finally to FIG. 18, the upper subassembly of this device is shown. It is made up of a movable plate, 164, carrying the second movable part, 165, to be positioned in relation to the first. This plate forms a unit with the translation module, 166, which is mounted on two swivel pins, 167, in order to facilitate the placement of the parts, 159 and 165. This translation module is controlled by a micrometric screw, 168, connected to a movable stop, 169. Furthermore, it is mounted obliquely in relation to the lower subassembly so as to permit the effectuation of such oblique translations.

It is understood that the embodiment described herein is merely exemplary and that a person skilled in the art may make many variations and modifications without departing from the spirit and scope of the invention. All such modifications and variations are intended to be included within the scope of the invention as defined in the appended claims.

What I claim is:

1. Apparatus for the precise positioning of first and second components with respect to each other comprising a frame, first support means for mounting said first component, and second support means for mounting said second component, wherein said first support means is coupled to said frame by an elastic joint member comprising a pair of elastically bendable members, whereby said first support means can be moved in relation to said second support means by bending said pair of elastically bendable members in a first direction.

2. The apparatus of claim 1 wherein said first and second components comprise optical components.

3. The apparatus of claim 1 wherein said pair of elastically bendable members are parallel to each in a direction perpendicular to said first direction.

4. The apparatus of claim 1 wherein said pair of elastically bendable members are arranged in a manner so as to converge with each other.

5. The apparatus of claim 1 wherein said pair of elastically bendable members comprise a first pair of elastically bendable members parallel to each other in a direction perpendicular to said first direction, and wherein said elastic joint member further comprises a second pair of elastically bendable members arranged in a manner so as to converge with each other.

6. The apparatus of claim 1 wherein said elastic joint member comprises a first elastic joint member, and wherein said second support means is coupled to said frame by a second elastic joint member comprising a pair of elastically bendable members, whereby said movement of said second support means is accomplished by bending said pair of elastically bendable members of said second elastic joint member in a second direction.

7. The apparatus of claim 6 wherein said first and second elastic joint members are integrally formed with said first and second support means, respectively.

8. The apparatus of claim 1 wherein said a pair of elastically bendable members of said second elastic joint member are parallel to each other in a direction perpendicular to said second direction.

9. The apparatus of claim 8 wherein said first and second directions are substantially perpendicular to each other.

10. The apparatus of claim 8 wherein said first and second directions are angularly displaced with respect to each other.

11. The apparatus of claim 1 wherein said bending of said elastic joint member occurs substantially in a first plane, and wherein at least one of said first and second support means includes mounting means permitting relative adjustment of said at least one of said first and second support means in a direction substantially perpendicular to said first plane.

12. The apparatus of claim 11 wherein said mounting means comprises an elastic membrane.

13. The apparatus of claim 11 wherein said first support means includes said mounting means, said mounting means comprising holding strip means, said holding strip means being elastically bendable in said direction substantially perpendicular to said first plane.

14. Apparatus for the precise positioning of first and second components with respect to each other, comprising a frame, first support means for mounting said first component and second support means for mounting said second component, wherein said first support means is coupled to said frame by a first pair of elastically bendable members converging with each other whereby bending of said first pair of elastically bendable members causes said first support means to rotate in a first plane, and a second pair of elastically bendable members parallel to each other whereby bending of said second pair of elastically bendable members causes said first support means to move in said first plane in a first direction substantially perpendicular to said second pair of elastically bendable members, and wherein said second support means is coupled to said frame by a third pair of elastically bendable members parallel to each other whereby bending of said third pair of elastically bendable members causes said second support means to move in a second plane parallel to said first plane in a second direction substantially perpendicular to said third pair of elastically bendable members.

15. The apparatus of claim 14, wherein said first and second directions are substantially perpendicular to each other.

16. The apparatus of claim 14, wherein said first and second directions are at a predetermined angle with respect to each other.

17. The apparatus of claim 14 wherein said first and second components comprise optical components.

18. The apparatus of claim 14 wherein at least one of said first and second support means includes mounting means permitting relative adjustment of said at least one of said first and second support means in a direction substantially perpendicular to said first and second planes.

19. The apparatus of claim 14 including first actuator means for bending said first pair of elastically bendable members and second actuator means for bending said second pair of elastically bendable members.

* * * * *

UNITED STATES PATENT AND TRADEMARK OFFICE
CERTIFICATE OF CORRECTION

PATENT NO. : 4,615,097

DATED : October 7, 1986

INVENTOR(S) : Pierre Genequand

It is certified that error appears in the above-identified patent and that said Letters Patent is hereby corrected as shown below:

Column 12, line 48, "claim 1" should read --claim 6--.

Signed and Sealed this

Seventeenth Day of February, 1987

Attest:

DONALD J. QUIGG

Attesting Officer

Commissioner of Patents and Trademarks